(12) United States Patent
Park et al.

(10) Patent No.: US 11,579,863 B2
(45) Date of Patent: Feb. 14, 2023

(54) METHOD FOR UPDATING FIRMWARE OF OPTICAL TRANSCEIVER

(71) Applicant: SOLiD, INC., Seongnam-si (KR)

(72) Inventors: Bum Soo Park, Seongnam-si (KR); Chi Young Park, Siheung-si (KR); Gil Koog Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 26 days.

(21) Appl. No.: 17/075,253

(22) Filed: Oct. 20, 2020

(65) Prior Publication Data

US 2021/0117179 A1   Apr. 22, 2021

(30) Foreign Application Priority Data

Oct. 21, 2019 (KR) .................. 10-2019-0130343
Oct. 20, 2020 (KR) .................. 10-2020-0136216

(51) Int. Cl.
*G06F 8/65* (2018.01)
*H04B 10/40* (2013.01)
*H04B 10/50* (2013.01)
*H04B 10/60* (2013.01)

(52) U.S. Cl.
CPC .............. *G06F 8/65* (2013.01); *H04B 10/40* (2013.01); *H04B 10/50* (2013.01); *H04B 10/60* (2013.01)

(58) Field of Classification Search
CPC ............ G06F 8/65; H04L 67/34; H04J 14/00; H04B 10/40; H04B 10/50; H04B 10/60
See application file for complete search history.

(56) References Cited

U.S. PATENT DOCUMENTS

| | | | |
|---|---|---|---|
| 8,111,999 B2 | 2/2012 | Ekkizogloy et al. | |
| 10,009,108 B2* | 6/2018 | Elahmadi | ............... G02B 6/00 |
| 10,313,850 B2* | 6/2019 | Kumar | ................... H04L 67/10 |
| 10,700,778 B2* | 6/2020 | Coffey | ................ H04B 10/801 |
| 10,812,762 B2* | 10/2020 | Sannala | ........... G08B 13/19619 |

(Continued)

FOREIGN PATENT DOCUMENTS

| | | | |
|---|---|---|---|
| CN | 107959530 B | * 10/2020 | ........... G02B 6/4292 |
| KR | 10-2006-0004045 A | 1/2006 | |

(Continued)

OTHER PUBLICATIONS

Chang et al., "Line Current Differential: Communication Channel Considerations", 2014, IEEE (Year: 2014).*
Jackson et al., "Operational performance of the EVLA digital transmission system", 2002, SPIE (Year: 2002).*

(Continued)

*Primary Examiner* — Wei Y Zhen
*Assistant Examiner* — Junchun Wu
(74) *Attorney, Agent, or Firm* — Sughrue Mion, PLLC

(57) ABSTRACT

Provided is an optical transceiver including: a controller configured to output firmware update data for updating firmware of another optical transceiver connected to the optical transceiver through an optical cable; and a transmitter configured to generate an optical signal by superposing input payload data and the firmware update data, and to transmit the optical signal to the other optical transceiver. According to embodiments, the firmware of a remote optical transceiver at a remote location is automatically updated without affecting payload data, which is information to be transmitted.

8 Claims, 4 Drawing Sheets

(56) References Cited

U.S. PATENT DOCUMENTS

| | | | | |
|---|---|---|---|---|
| 2002/0188934 | A1* | 12/2002 | Griffioen | G06F 8/65 717/173 |
| 2006/0093367 | A1* | 5/2006 | Ekkizogloy | H04B 10/40 398/135 |
| 2009/0116845 | A1* | 5/2009 | Li | H04B 10/40 398/135 |
| 2009/0153574 | A1 | 6/2009 | Chou et al. | |
| 2012/0134680 | A1* | 5/2012 | Ekkizogloy | H04B 10/40 398/135 |
| 2016/0041820 | A1* | 2/2016 | Ricci | G01C 21/26 717/172 |
| 2016/0335072 | A1* | 11/2016 | Choo | H04B 10/40 |
| 2019/0165865 | A1* | 5/2019 | Nakagawa | H04J 14/0276 |
| 2020/0136722 | A1* | 4/2020 | Urban | H04B 10/0779 |
| 2021/0117179 | A1* | 4/2021 | Park | H04B 10/60 |
| 2021/0274068 | A1* | 9/2021 | Masarik | H04B 10/11 |

FOREIGN PATENT DOCUMENTS

| | | | | |
|---|---|---|---|---|
| WO | WO-2018130362 A1 * | 7/2018 | ........... | H04B 10/071 |
| WO | WO-2022037227 A1 * | 2/2022 | | |

OTHER PUBLICATIONS

Ahearne et al., "Software Defined Control of Tunable Optical Transceivers using NETCONF and YANG", 2018, IEEE (Year: 2018).*

Fortuna et al., "Software interfaces for control, optimization and update of 5G machine type communication networks", 2017, Elsevier B.V. (Year: 2017).*

Wikipedia, "Wavelength-division multiplexing", Retrieved from "https://en.Wikipedia.org/w/index.php?title=Wavelengthdivision_multiplexing&oldid=916487861", Sep. 19, 2019, (6 pages total).

Communication dated Mar. 16, 2021, from the European Patent Office in application No. 20203001.1.

* cited by examiner

METHOD FOR UPDATING FIRMWARE OF OPTICAL TRANSCEIVER

CROSS-REFERENCE TO RELATED APPLICATION

This application claims the benefit of Korean Patent Application No. 10-2019-0130343, filed on Oct. 21, 2019, and Korean Patent Application No. 10-2020-0136216, filed on Oct. 20, 2020, in the Korean Intellectual Property Office, the disclosures of which are incorporated herein in its entirety by reference.

BACKGROUND

1. Field

The disclosure relates to a method of updating firmware of an optical transceiver such as a gigabit interface converter (GBIC), small form-factor pluggable (SFP), and the like.

2. Description of the Related Art

A passive optical network (hereinafter referred to as 'PON') has become the core of FTTH environment implementation and Giga-bit Ethernet implementation. The PON includes an optical line terminal (OLT) of a central office, a remote node (RN) to allow multiple subscribers to share one feeder optical cable, and an optical network terminal (ONT) or an optical network unit (ONU) on a subscriber side. An optical cable is connected to an optical transceiver of the OLT and ONT and an optical transceiver of the ONT or ONU, respectively, to connect the OLT to the ONT/ONU. The optical transceiver is for transmitting and receiving an optical signal through an optical cable connected to the optical transceiver, and may be an optical transmission/reception module such as a gigabit interface converter (GBIC), small form-factor pluggable (SFP), and the like.

The ONT (or ONU) is at a location separated by a certain distance from the OLT of the central office, and the separation distance between the OLT and the ONT (or ONU) is generally several kilometers to tens of kilometers. Therefore, there is a problem that it is very cumbersome and takes a long time when an administrator individually visits the site where the OLT (or ONU) is located in order to update the firmware of the optical transceiver mounted on the ONT (or ONU).

SUMMARY

Provided are methods of automatically updating the firmware of an optical transceiver without an administrator visiting.

Additional aspects will be set forth in part in the description which follows and, in part, will be apparent from the description, or may be learned by practice of the presented embodiments.

According to an aspect of an embodiment, an optical transceiver includes a controller configured to output firmware update data for updating firmware of another optical transceiver connected to the optical transceiver through an optical cable; and a transmitter configured to generate an optical signal by superposing input payload data and the firmware update data, and to transmit the optical signal to the other optical transceiver, wherein a first communication channel corresponding to the payload data and a second communication channel corresponding to the firmware update data are different from each other.

According to an exemplary embodiment, the controller may transmit a firmware identification information request for determining whether the firmware needs to be updated to the transmitter, and the transmitter may generate an optical signal by superposing the input payload data and the firmware identification information request, and transmits the optical signal to the other optical transceiver, wherein the firmware identification information request may be transmitted to the other optical transceiver through the second communication channel.

According to an exemplary embodiment, the optical transceiver may further include a receiver configured to output firmware identification information received through the second communication channel from the other optical transceiver to the controller in response to the firmware identification information request, wherein the controller may output the firmware identification information to a main controller such that the main controller of an optical communication device to which the optical transceiver is connected compares the firmware identification information with previously stored information to determine whether the update is required.

According to an exemplary embodiment, the second communication channel may be an auxiliary management and control channel (AMCC).

According to an exemplary embodiment, the firmware update data may be transmitted in a time division manner together with data for management and control of the other optical transceiver through the second communication channel.

According to an exemplary embodiment, the firmware update data may be transmitted simultaneously with data for management and control of the other optical transceiver through the second communication channel.

According to an exemplary embodiment, the controller may output some pieces of divided data among a plurality of pieces of divided data obtained by dividing the firmware update data, and the transmitter may generate the optical signal by superposing the input payload data and the some pieces of divided data.

According to an aspect of another embodiment, an optical transceiver includes a receiver configured to receive an optical signal in which payload data and firmware update data are superposed with each other from another optical transceiver connected to the receiver through an optical cable; and a controller configured to receive the firmware update data from the optical signal and control a firmware update using the firmware update data, wherein the payload data is received through a first communication channel, and the firmware update data is received through a second communication channel.

According to an exemplary embodiment, the optical transceiver may further include a transmitter configured to transmit firmware identification information to the other optical transceiver through the second communication channel, wherein the firmware identification information may be read from a memory by the controller in response to a firmware identification information request received through the receiver.

According to an exemplary embodiment, the second communication channel may be an auxiliary management and control channel (AMCC).

According to an exemplary embodiment, the controller, when some pieces of divided data among a plurality of pieces of divided data obtained by dividing the firmware update data is received, may control the firmware update by receiving remaining divided data received through at least one other optical transceiver from an optical communication device to which the optical transceiver is connected.

According to embodiments, the firmware of a remote optical transceiver may be automatically updated without affecting information to be transmitted (Payload Data) and without an administrator visiting.

Effects obtainable by the embodiments of the disclosure are not limited to the effects described above, and other effects not described herein may be clearly understood by one of ordinary skill in the art to which the inventive concept belongs from the above description.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
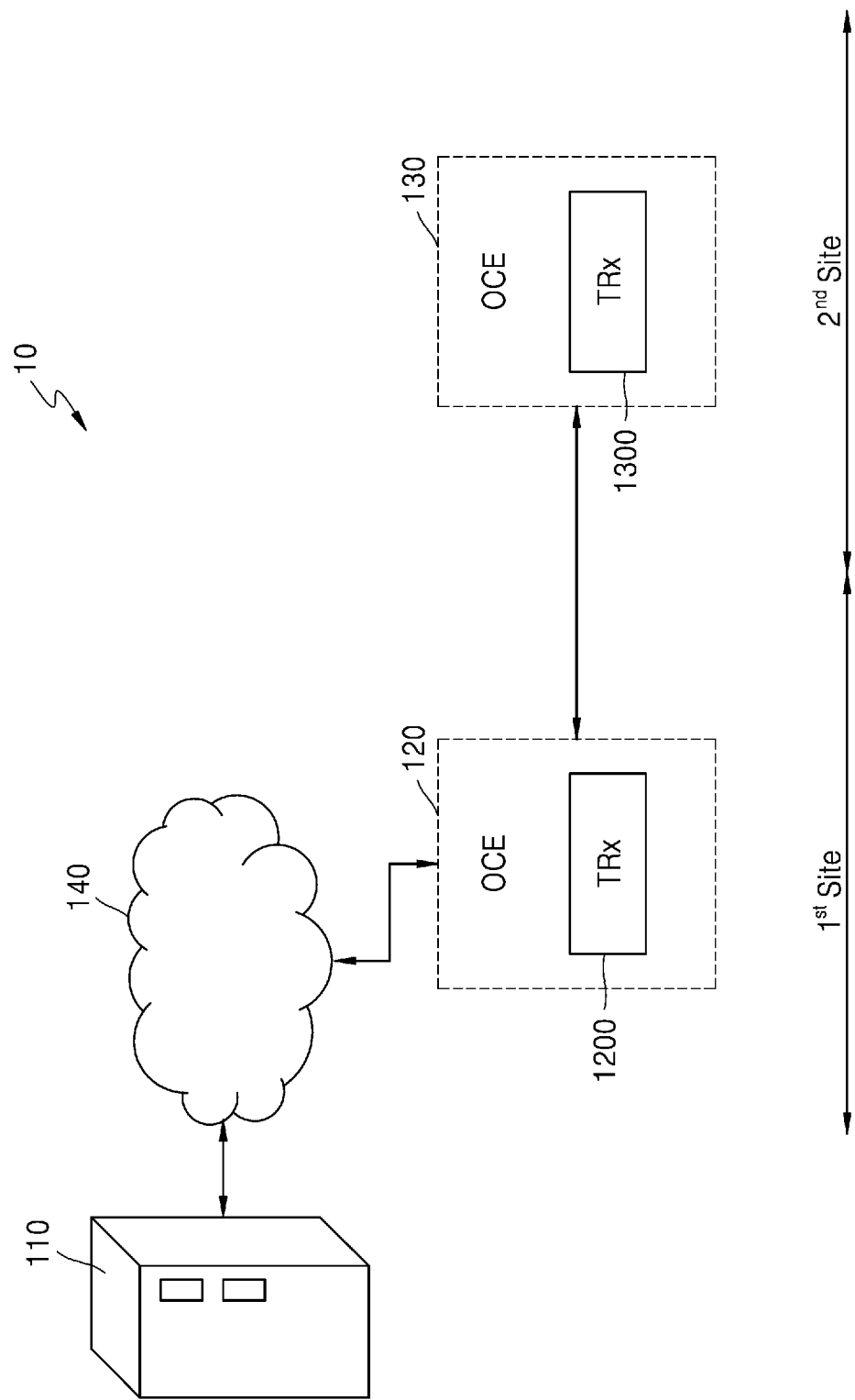
FIG. 1 is a view of an optical communication system according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

Hereinafter, various embodiments of the disclosure will be described in detail in order.

FIG. 1 is a view of an optical communication system according to an embodiment.

Referring to FIG. 1, an optical communication system 10 according to an embodiment may include a server 110, a first optical communication device 120, and a second optical communication device 130. In FIG. 1, only one second optical communication device 130 is illustrated for convenience of description, but the inventive concept of the disclosure is not limited thereto.

The server 110 and the first optical communication device 120 may be connected to each other by wire and/or wirelessly through the network 140. The network 140 may be a generic concept including a communication network such as the Internet, a mobile network, and an intranet.

The server 110 manages the optical communication system 10, and may store firmware of an optical transceiver of each optical communication device to be updated (or restored to its original state) (hereinafter referred to as 'target firmware') and identification information about the target firmware (e.g., information about the name, version, and date of the latest update of the target firmware) (hereinafter referred to as 'firmware identification information'). When the first optical communication device 120 requests firmware identification information, the server 110 may read firmware identification information from a storage and transmit the firmware identification information to the first optical communication device 120. In addition, when the first optical communication device 120 requests firmware, the server 110 may read target firmware from the storage and transmit the target firmware to the first optical communication device 120.

The first optical communication device 120 may be located on the side of a first site, and may include at least one optical transceiver 1200. In addition, the second optical communication device 130 may be located at a second site apart from the first site by a certain distance, and may include at least one optical transceiver 1300. The first optical communication device 120 and the second optical communication device 130 may be communicatively connected to each other through respective optical transceivers and an optical cable connecting them.

The first optical communication device 120, by comparing the target firmware stored in the server 110 with firmware installed in the optical transceiver 1300 of the second optical communication device 130, may determine whether the firmware installed in the optical transceiver 1300 of the second optical communication device 130 needs to be updated.

When it is determined that the firmware installed in the optical transceiver 1300 of the second optical communication device 130 needs to be updated, the first optical communication device 120 may transmit firmware update data from the optical transceiver 1200 to the optical transceiver 1300 through an auxiliary management control channel to perform an 'automatic firmware update operation' in which the firmware of the optical transceiver 1300 is updated. The automatic firmware update operation may be controlled by the first optical communication device 120, more specifically, a main controller (see 121 of FIG. 2), but is not limited thereto, and may be controlled by the server 110 or an administrator. In addition, the automatic firmware update operation, for example, operations related to transmission of firmware update data, may be performed simultaneously with transmission of payload data through the optical transceiver 1200 of the first optical communication device 120, but may not have any effect on the transmission of the payload data.

The optical transceiver 1300 of the second optical communication device 130 may transmit information about the installed firmware (e.g., information about the name of the firmware, version, and date of the last update of the target firmware) (hereinafter referred to as 'remote firmware identification information') to the first optical communication device 120. Further, when firmware update data is transmitted from the first optical communication device 120, more specifically, the optical transceiver 1200 of the first optical communication device 120, according to the automatic firmware update operation, the optical transceiver 1300 of the second optical communication device 130 may automatically install the firmware update data.

A detailed description of the automatic firmware update operation will be described in more detail below with reference to FIGS. 2 to 4.

Meanwhile, in some embodiments, the optical communication system 10 may be applied to an optical subscriber network. In this case, the first optical communication device 120 may be an optical line terminal (OLT) at a central office side. In addition, the second optical communication device 130 may be any one of a remote terminal (RT), an optical network terminal (ONT) at a subscriber side, and an optical network unit.

In another embodiment, the optical communication system 10 may be applied to a fronthaul transmission network of a distributed base station. In this case, the first optical communication device 120 may be a digital unit (DU) at the central office side or a termination device at a baseband unit (BBU) side. In addition, the second optical communication device 130 may be a remote unit (RU) or a remote radio head (RRH).

In another embodiment, the optical communication system 10 may be applied to a distributed antenna system (DAS) for solving a shadow area of a base station. In this case, the first optical communication device 120 may be a headend unit, and the second optical communication device 130 may be an extension unit or a remote unit.

As described above, the optical communication system 10 according to the inventive concept may be applied to various optical communication networks implemented by optical communication devices that are located remotely from each other and transmit and receive optical signals through corresponding optical transceivers.

Hereinafter, an 'automatic firmware update operation' in which firmware of an optical transceiver at a remote location is updated according to embodiments will be described in detail with reference to FIGS. 2 to 4. The 'automatic firmware update operation' to be described later below is an operation performed through the optical transceivers 1200 and 1300 connected to the first and second optical communication devices 120 and 130, and in particular, may be an operation for updating firmware of the optical transceiver 1300 connected to the second optical communication device 130, for example, a gigabit interface converter (GBIC) or small form-factor pluggable (SFP).

Figure 2:
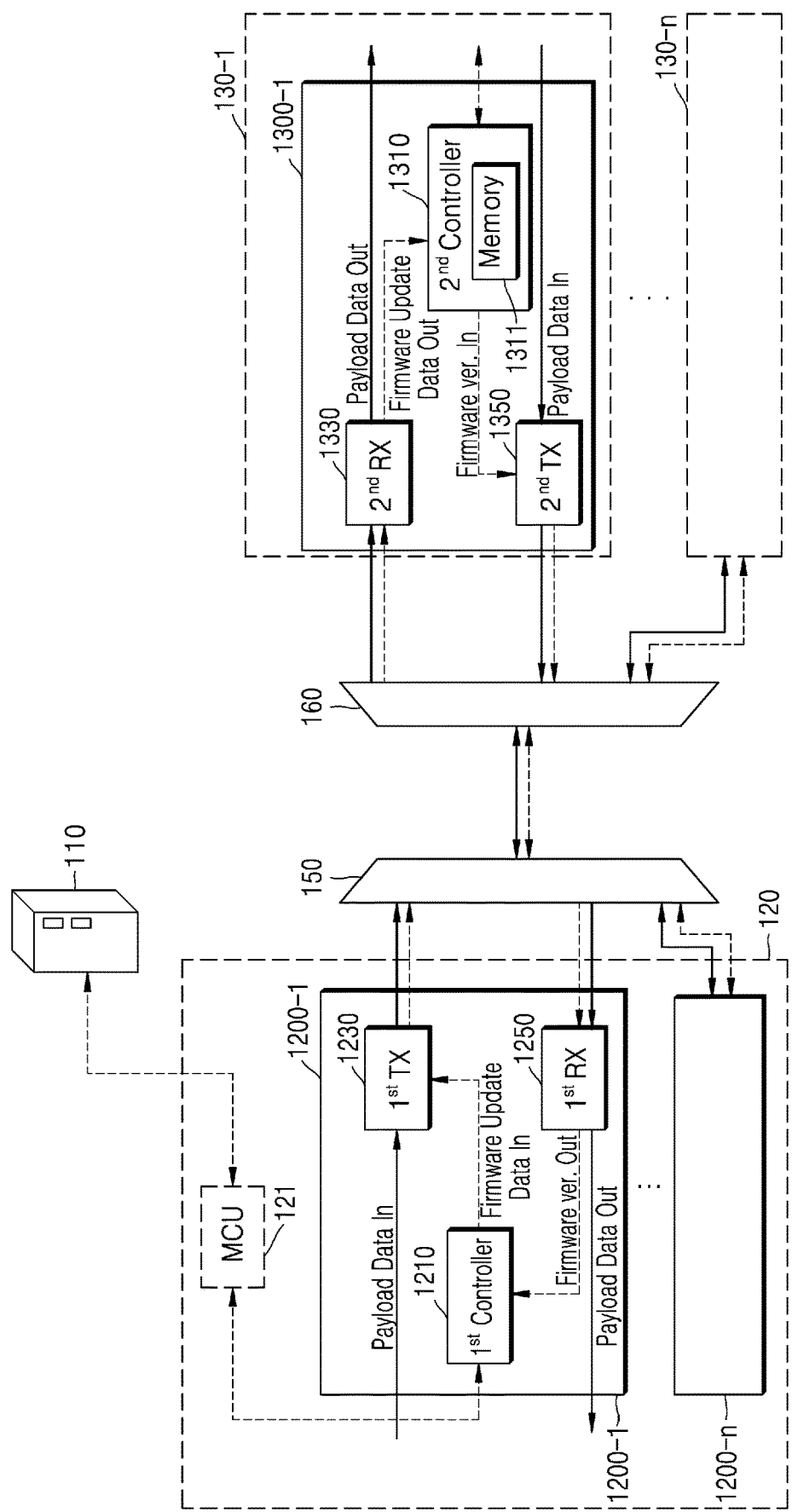
FIG. 2 is a block diagram illustrating in more detail a main portion of an optical transceiver in an optical communication system according to an embodiment.

FIG. 2 is a block diagram illustrating in more detail a main portion of an optical transceiver in an optical communication system according to an embodiment. In FIG. 2, the optical communication system 10 of FIG. 1 shows the main portion of the optical transceiver in more detail on the premise of an embodiment applied to a WDM-PON.

Referring to FIG. 2, among a plurality of optical communication devices constituting the optical communication system 10 according to an embodiment, the first optical communication device 120 may include a first main controller (MCU) 121 and n first optical transceivers 1200-1 to 1200-$n$ (where n is a natural number of 2 or more).

Each of the n first optical transceivers 1200-1 to 1200-$n$ may include a first controller 1210, a first transmitter 1230, and a first receiver 1250. The n first optical transceivers 1200-1 to 1200-$n$ may be connected to a first MUX 150 to transmit an optical signal to the first MUX 150 or may receive an optical signal of a corresponding wavelength band from the first MUX 150.

In addition, among a plurality of optical communication devices constituting the optical communication system 10 according to an embodiment, n second optical communication devices 130-1 to 130-$n$ may include corresponding optical transceivers among n second optical transceivers 1300-1 to 1300-$n$, respectively.

Each of the n second optical transceivers 1300-1 to 1300-$n$ may include a second controller 1310, a second receiver 1330, and a second transmitter 1350. The n second optical transceivers 1300-1 to 1300-$n$ may be connected to a second MUX 160 to transmit an optical signal to the second MUX 160 or to receive an optical signal from the second MUX 160.

According to an embodiment, the first MUX 150 on the first optical communication device 120 side may be a separate device separated from the first optical communication device 120 or may be a component provided inside the first optical communication device 120. In addition, the second MUX 160 may be a separate device from the n second optical communication devices 130-1 to 130-$n$, but may be configured in plural and may be provided inside the n second optical communication devices 130-1 to 130-$n$, respectively. In this case, the n second optical communication devices 130-1 to 130-$n$ may include a plurality of optical transceivers, respectively.

According to an embodiment, the first optical communication device 120, the first MUX 150, and the second MUX 160 may be connected to each other in a ring topology. In addition, according to an embodiment, a plurality of sub-multiplexers may be connected to the second MUX 160, and a tree topology may be formed in such a way that the second optical communication devices 130-1 to 130-$n$ are connected to the sub-multiplexers.

Hereinafter, for convenience of description, it is assumed that the first optical transceiver 1200-1 of the first optical communication device 120 and the second optical transceiver 1300-1 of the second optical communication device 130-1 among the second optical communication devices 130-1 to 130-$n$ are optical transceivers communicating with each other using allocated wavelength(s), and each configuration will be described centering on them.

First, the first MCU 121 is configured to control the overall operation of the first optical communication device 120, and may receive firmware identification information from the server 110 connected to the first MCU 121 through the network 140. In addition, the first MCU 121 may recognize information about target firmware through the firmware identification information. In addition, the first MCU 121 may determine whether firmware installed in the second optical transceiver 1300-1 needs to be updated, and may control an automatic firmware update operation to be performed.

The first controller 1210 is configured to be connected to the first MCU 121 by wire or wirelessly, and may manage and control the first optical transceiver 1200-1. The first controller 1210 may manage transmission and reception of payload data between the first optical transceiver 1200-1 and the second optical transceiver 1300-1 and management and control (wavelength setting/control, communication status monitoring, etc.) thereof, and transmission and reception of information necessary for a firmware update (hereinafter referred to as first auxiliary management data). The first controller 1210 is an active component of the first optical transceiver 1200-1, and may be a term collectively referring to a memory in which a processor, firmware, or the like that performs various controls and processes for transmitting low-speed first auxiliary management data through an auxiliary management and control channel along with high-speed payload data.

The first controller 1210 may transmit the first auxiliary management data to the second optical transceiver 1301-1 according to various methods.

For example, the first controller 1210 may simultaneously transmit the first auxiliary management data and the payload data to the second optical transceiver 1300-1 through a baseband intensity over-modulation method. For another example, the first controller 1210 may superpose the first auxiliary management data and the payload data and may transmit the same to the second optical transceiver 1300-1 through a radio frequency (RF) pilot tone method.

The baseband intensity over-modulation method is a technology in which the first auxiliary management data is stacked on top of the payload data, and the RF pilot tone method is a technology of superposing ASK or FSK modulated first auxiliary management data with the payload data. A transmission rate of the first auxiliary management data may be different from a transmission rate of the payload data. For example, a frequency of the first auxiliary management data may be several kHz, and a frequency of the payload data may be tens to hundreds of MHz. A first auxiliary management data transmission/reception method, such as the baseband intensity over-modulation and the RF pilot tone method, has already been disclosed, and thus detailed contents thereof are omitted.

Meanwhile, the first controller 1210 may transmit management and control data and firmware update data of the first auxiliary management data in a time division manner through an auxiliary management and control channel (AMCC). For example, the first controller 1210 may modulate the management and control data and the firmware update data by an ASK, FSK method, etc., and may transmit the management and control data and firmware update data that are modulated, by dividing a band of the AMCC based on time.

According to an embodiment, the first controller 1210 may simultaneously transmit the management and control data and the firmware update data of the first auxiliary management data through the AMCC. For example, the first controller 1210 may modulate the management and control data and the firmware update data in a manner such as quadrature phase shift keying (QPSK), or the like, and may separate and transmit the management and control data and firmware update data that are modulated, simultaneously through sub-channels separated from the AMCC. This will be described later below.

The first transmitter 1230 is configured to convert the input payload data and/or the first auxiliary management data into an optical signal. The first transmitter 1230 may include transmitter optical sub-assemblies (TOSA) including a laser diode, a laser diode driving circuitry (LDD), a biasing circuitry, and the like. The payload data input to the first transmitter 1230 may be input through the LDD.

The first MUX 150 may be configured to multiplex the optical signal input from the first transmitter 1230 and transmit the optical signal through an optical cable, and to demultiplex signals received from the optical cable.

The first receiver 1250 may divide an optical signal input from the first MUX 150 by demultiplexing into payload data and second auxiliary management data (the definition of the second auxiliary management data will be described later below) and output them in corresponding configurations, respectively. In particular, the first receiver 1250 may output the second auxiliary management data to the first controller 1210. The first receiver 1250 may include a receiver optical sub-assembly (ROSA) including a photo diode and a transimpedance amplifier (TIA), a post amplifier, and the like.

The second controller 1310 of the second optical transceiver 1301-1 may be configured to control the overall operation of the second optical transceiver 1300-1.

The second controller 1310 may manage transmission and reception of payload data between the first optical transceiver 1200-1 and the second optical transceiver 1300-1 and management and control (wavelength setting, communication status monitoring, etc.) thereof, and transmission and reception of information for remote firmware identification (hereinafter referred to as second auxiliary management data). The second controller 1310 may transmit the payload data and the second auxiliary management data to the first optical transceiver 1200-1 according to various methods. Like the first controller 1210, the second controller 1310 may transmit the second auxiliary management data to the first optical transceiver 1200-1 without affecting the payload data through various methods. In addition, the second controller 1310, like the first controller 1210, may transmit management and control data of the second auxiliary management data and data related to a firmware update to the first optical transceiver 1200-1 in a time-division manner or simultaneously. The second controller 1310 is an active component of the second optical transceiver 1300-1, and may collectively refer to a processor that processes and controls information that can be transmitted and received through an auxiliary management and control channel, a memory in which firmware, etc. are stored, and the like.

The second receiver 1330 may be configured to correspond to the first receiver 1250, and the second transmitter 1350 may be configured to correspond to the first transmitter 1230.

The payload data and the second auxiliary management data transmitted to the first optical transceiver 1200-1 through the second transmitter 1350 and the second MUX 160 may be converted into an optical signal and multiplexed. An optical signal received from the first optical transceiver 1200-1 through the second MUX 160 and the second receiver 1330 may be demultiplexed and converted into an electrical signal.

In the above, the overall functions of components of each of the first and second optical transceivers 1200-1 and 1300-1 have been described. Hereinafter, an automatic firmware update operation of the second optical transceiver 1301-1 through the first optical transceiver 1200-1 and the second optical transceiver 1300-1 will be described in detail with reference to FIG. 3.

Figure 3:
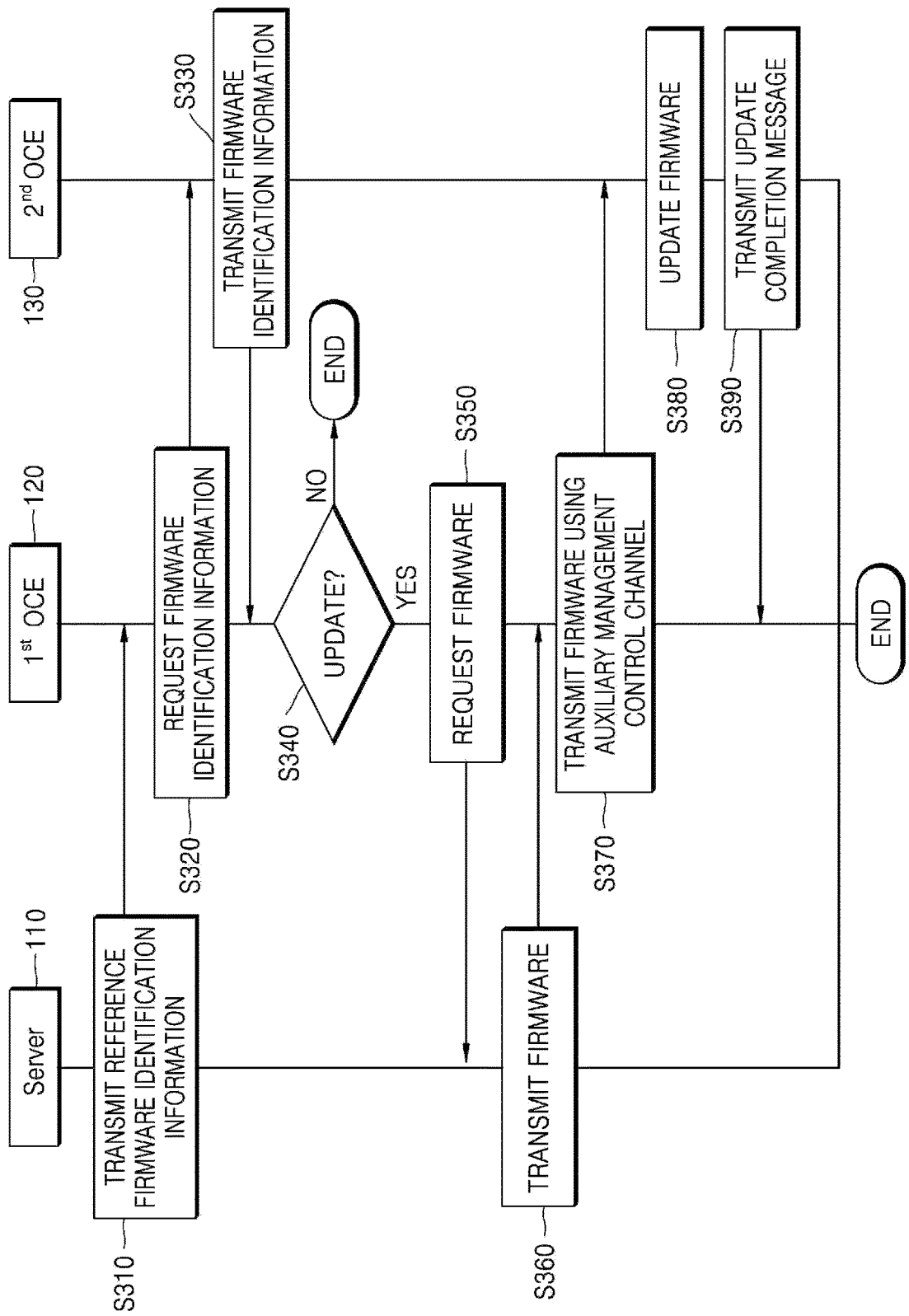
FIG. 3 is a flowchart illustrating a method of updating firmware of an optical transceiver according to an embodiment.

FIG. 3 is a flowchart illustrating a method of updating firmware of an optical transceiver according to an embodiment.

Referring to FIG. 3, in operation S310, the server 110 may transmit firmware identification information (hereinafter referred to as reference firmware identification information) to the first MCU 121 of the first optical communication device 120. The first MCU 121 may receive the reference firmware identification information and store the same in a storage (not shown) provided therein. However, the disclosure is not limited thereto, and the first MCU 121 may store the reference firmware identification information in a separate storage (not shown) provided in the first optical communication device 120.

In operation S320, the first optical communication device 120 may generate a remote firmware identification information request to receive information about firmware installed in the second optical transceiver 1300-1 (remote firmware identification information), and may transmit the remote firmware identification information request from the first optical transceiver 1200-1 to the second optical transceiver 1300-1 through the AMCC.

For example, in order to request the remote firmware identification information from the second optical transceiver 1300-1, the first MCU 121 may generate a firmware identification information request (means command or message) and output the same to the first controller 1210 of the first optical transceiver 1200-1. The first controller 1210 may output the firmware identification information request as 'auxiliary management data' to the first transmitter 1230. The auxiliary management data is data output from the first or second controller 1210 or 1310 and may be distinguished from payload data. The first transmitter 1230 may generate an optical signal by superposing the firmware identification information request, which is input as the auxiliary management data, and the payload data. The first MUX 150 may multiplex the optical signal generated by the first transmitter 1230 and transmit the same to the second MUX 160 through an optical cable.

In operation S330, the second optical transceiver 1301-1 may receive the firmware identification information request through the auxiliary management data included in the optical signal, and accordingly, may transmit firmware identification information (referred to as 'remote firmware identification information' to distinguish it from the firmware identification information stored in the server 110) stored in a memory 1311 or a storage separately provided in the second optical transceiver 1300-1 to the first optical transceiver 1200-1. In this case, the second optical transceiver 1300-1 may transmit the remote firmware identification information to the first optical transceiver 1200-1 through the AMCC.

For example, the second MUX 160 may demultiplex and output an optical signal received from the first optical transceiver 1200-1 through an optical cable. The demultiplexed optical signal may be output to the second receiver 1330. The second receiver 1330 may divide the optical signal into payload data and auxiliary management data, and may output the auxiliary management data to the second controller 1310. The second controller 1310 may analyze the auxiliary management data to recognize firmware identification information request, and may read remote firmware identification information stored in a storage (not shown) inside the second optical transceiver 1300-1. The second controller 1310 may output the remote firmware identification information as 'auxiliary management data' to the second transmitter 1350. The second transmitter 1350 may generate an optical signal by superposing the remote firmware identification information, which is input as auxiliary management data, and input payload data. The second MUX 160 may multiplex the optical signal generated by the second transmitter 1350 and transmit the same to the first MUX 150 through an optical cable.

The first MUX 150 may demultiplex and output the optical signal received through the optical cable. The demultiplexed optical signal may be output to the first receiver 1250. The first receiver 1250 may divide the optical signal into payload data and auxiliary management data, and may output the auxiliary management data to the first controller 1210. The first controller 1210 may recognize remote firmware identification information by analyzing auxiliary management data received from the second optical transceiver 1300-1.

In operation S340, the first optical communication device 120 may compare the remote firmware identification information with the previously stored firmware identification information to determine whether firmware installed in the second optical transceiver 1300-1 needs to be updated.

For example, the first MCU 121 may compare the version of firmware included in the remote firmware identification information with the version included in the firmware identification information received from the server 110. When the comparison result is different, the first MCU 121 may determine that the firmware installed in the second optical transceiver 1300-1 needs to be updated. When the comparison result is the same, the first MCU 121 may determine that updating of the firmware installed in the second optical transceiver 1300-1 is unnecessary, and may terminate the update operation.

In operations S350 to S360, when it is determined that the firmware installed in the second optical transceiver 1300-1 needs to be updated, the first optical communication device 120 may download target firmware from the server 110. For example, the first MCU 121 may generate a firmware request and transmit the firmware request to the server 110. When the firmware request is received, the server 110 may read the previously stored target firmware from a storage space and transmit the target firmware to the first MCU 121.

In operation S370, the first optical communication device 120 may transmit the target firmware received from the server 110 from the first optical transceiver 1200-1 to the second optical transceiver 1300-1 through the AMCC. For example, the first MCU 121 and/or the first controller 1210 may transmit the target firmware to the second optical transceiver 1301-1 through the AMCC by the same or similar method as in operation S320.

In this case, the first transmitter 1230 may be preset to superpose auxiliary management data modulated by using the different channel (AMCC) than a channel for transmitting payload data. The AMCC is an auxiliary channel for controlling and managing optical transceivers such as SFP and the like, and the disclosure transmits firmware using the AMCC.

The disclosure proposes to divide and use the AMCC into two channels again. That is, the auxiliary management data may be modulated in a manner using a plurality of channels, and target firmware may correspond to one or more of the plurality of channels.

In this case, the configuration of modulating the auxiliary management data in the manner using a plurality of channels may be implemented by a modulator (not shown). For example, the modulator may be formed to be electrically or optically connected to the first controller 1210 and the first transmitter 1230. The modulator may modulate the auxiliary management data input from the first controller 1210 by a quadrature phase shift keying (QPSK) method, which is a method using a plurality of channels. Thereafter, the modulator may match two of four phases of a carrier wave to the target firmware and the other two phases to general information for controlling and managing an optical transceiver at a remote location (i.e., information corresponding to the original purpose of the AMCC). The modulator may output the modulated auxiliary management data to the first transmitter 1230. Accordingly, the target firmware in the AMCC may be transmitted to the second optical transceiver 1300-1 through a dedicated channel for a firmware update (2 preset among the 4 phases of the carrier wave).

Meanwhile, transmitting data using the AMCC is significantly slower than transmitting payload data. Accordingly, when a plurality of optical transceivers are connected to each of the first optical communication device 120 and the second optical communication device 130, the target firmware may be divided and transmitted. For this, an operation of dividing and transmitting the target firmware to several optical transceivers will be described with reference to FIG. 4.

Referring back to FIG. 3, in operation S380, the second optical transceiver 1300-1 may automatically update firmware using the target firmware received through the AMCC. For example, the second controller 1310 may analyze the received target firmware as auxiliary management data by the same or similar method as in operation S330, and may control the target firmware to be stored and installed in the internal memory 1311 of the second controller 1310.

In operation S390, when the update of the firmware is completed, the second optical transceiver 1300-1 may transmit a message indicating that the update is completed (hereinafter referred to as an update completion message) to the first optical communication device 120. In this case, the update completion message may also be transmitted and received through the AMCC.

As described above, according to embodiments, because pieces of firmware update data are transmitted and received between optical transceivers apart from each other through an auxiliary management and control channel, a firmware update operation may be performed automatically without affecting transmission of payload data.

Figure 4:
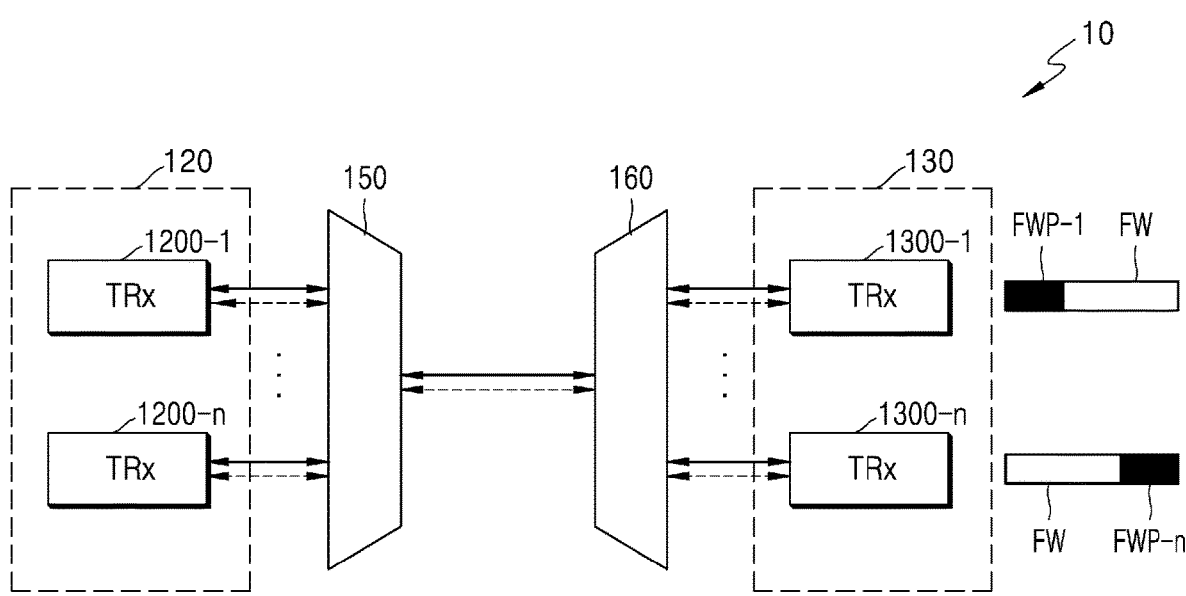
FIG. 4 is a view illustrating a method of updating firmware using a plurality of optical transceivers in an optical communication system according to an embodiment.

FIG. 4 is a view illustrating a method of updating firmware using a plurality of optical transceivers in an optical communication system according to an embodiment. FIG. 4 is for explaining an embodiment in which each of optical communication devices of an optical communication system 10' includes a plurality of optical transceivers like WDM-PON's OLT and RT, DU and RU of a distributed base station, and each unit of a DAS. In describing FIG. 4, for convenience of explanation, descriptions overlapping with those of FIGS. 1 to 3 will be omitted, and the differences will be mainly described with reference to FIGS. 1 to 3 together.

Referring to FIGS. 1 to 4, the first optical communication device 120 may include the n first optical transceivers 1200-1 to 1200-$n$. In addition, the second optical communication device 130 may include the n second optical transceivers 1300-1 to 1300-$n$.

The first MCU 121 of the first optical communication device 120 may divide firmware update data FW for target firmware to be transmitted corresponding to the n first optical transceivers 1200-1 to 1200-$n$ provided in the first optical communication device 120. For example, the first MCU 121 may divide the firmware update data FW to be transmitted into the number of first optical transceivers 1200-1 to 1200-$n$, that is, n. According to an embodiment, the number of divisions of the firmware update data FW may vary. For example, the number of divisions of the firmware update data FW does not correspond to the number of second optical transceivers, and may be divided more or less than that.

The first MCU 121 may distribute n pieces of divided data FWP-1 to FWP-n to the n first optical transceivers 1200-1 to 1200-$n$, respectively. Accordingly, each of the n first optical transceivers 1200-1 to 1200-$n$ may transmit divided data to a corresponding one of the n second optical transceivers 1300-1 to 1300-$n$. For example, the first optical transceiver 1200-1 may transmit the first divided data FWP-1 to the corresponding second optical transceiver 1300-1, and the first optical transceiver 1200-$n$ may transmit the $n^{th}$ divided data FWP-n to the corresponding second optical transceiver 1300-$n$.

According to an embodiment, the first MCU 121 may not allocate the n pieces of divided data FWP-1 to FWP-n uniformly to the n first optical transceivers 1200-1 to 1200-$n$, respectively, and may allocate a larger number of pieces of divided data to some of the first optical transceivers 1200-1 to 1200-$n$. This is to efficiently utilize resources considering a communication state of each of the first optical transceivers 1200-1 to 1200-$n$.

An MCU (not shown) of the second optical communication device 130 may receive n pieces of divided data received from the n second optical transceivers 1300-1 to 1300-$n$, respectively. The MCU may combine n pieces of divided data and output them to the n second optical transceivers 1300-1 to 1300-$n$, respectively. Alternatively, the MCU may not combine the n pieces of divided data and may transmit the remaining divided data that has not been received to the second optical transceivers 1300-1 to 1300-$n$, respectively.

As described above, the optical communication system 10' divides firmware update data into a certain number, and distributes and transmits the data through at least some of the plurality of optical transceivers, thereby improving the speed of an automatic firmware update.

Hereinabove, the disclosure has been described with reference to the preferred embodiments. However, it will be appreciated by one of ordinary skill in the art that various modifications and changes of the disclosure can be made without departing from the spirit and the scope of the inventive concept which are defined in the appended claims and their equivalents.

The invention claimed is:

1. An optical transceiver comprising:
   a controller configured to output firmware update data for updating firmware of another optical transceiver connected to the optical transceiver through an optical cable; and
   a transmitter configured to generate a first optical signal by superposing first payload data and the firmware update data, and to transmit the first optical signal to the other optical transceiver,
   wherein a first communication channel corresponding to the first payload data and a second communication channel corresponding to the firmware update data are different from each other,
   wherein the second communication channel is an auxiliary management and control channel (AMCC) that transmits data for management and control, wherein the controller is configured to modulate the firmware update data and the data for management and control, and to transmit the modulated firmware update data and the data for management and control through the AMCC together, wherein the controller transmits a firmware identification information request for determining whether the firmware needs to be updated to the transmitter, wherein the transmitter generates a second optical signal by superposing second payload data and the firmware identification information request, and transmits the second optical signal to the other optical transceiver, and wherein the firmware identification information request is transmitted to the other optical transceiver through the second communication channel.

2. The optical transceiver of claim 1, further comprising:
a receiver configured to output firmware identification information received through the second communication channel from the other optical transceiver to the controller in response to the firmware identification information request, wherein the controller outputs the firmware identification information to a main controller such that the main controller of an optical communication device to which the optical transceiver is connected compares the firmware identification information with previously stored information to determine whether the update is required.

3. The optical transceiver of claim 1, wherein the firmware update data is transmitted in a time division manner together with the data for management and control of the other optical transceiver through the second communication channel.

4. The optical transceiver of claim 1, wherein the firmware update data is transmitted simultaneously with the data for management and control of the other optical transceiver through the second communication channel.

5. The optical transceiver of claim 1, wherein the controller outputs some pieces of divided data among a plurality of pieces of divided data obtained by dividing the firmware update data, and the transmitter generates the first optical signal by superposing the first payload data and the some pieces of divided data.

6. An optical transceiver comprising:
a receiver configured to receive a first optical signal in which first payload data and firmware update data are superposed with each other from another optical transceiver connected to the receiver through an optical cable; and a controller configured to receive the firmware update data from the first optical signal and control a firmware update using the firmware update data, wherein the first payload data is received through a first communication channel, and the firmware update data is received through a second communication channel, wherein the second communication channel is an auxiliary management and control channel (AMCC) that transmits data for management and control, wherein the controller receives the firmware update data modulated with the data for management and control through the second communication channel, wherein the receiver receives from the other optical transceiver a second optical signal in which firmware identification information request is superposed with second payload data, and wherein firmware identification information about firmware of the optical transceiver is read from a memory by the controller in response to the second optical signal being received from the other optical transceiver.

7. The optical transceiver of claim 6, further comprising:
a transmitter configured to transmit the firmware identification information to the other optical transceiver through the second communication channel.

8. The optical transceiver of claim 6, wherein the controller, when some pieces of divided data among a plurality of pieces of divided data obtained by dividing the firmware update data is received, controls the firmware update by receiving remaining divided data received through at least one other optical transceiver from an optical communication device to which the optical transceiver is connected.

* * * * *